United States Patent [19]
Anderton

[11] Patent Number: 5,619,261
[45] Date of Patent: Apr. 8, 1997

[54] PIXEL ARTIFACT/BLEMISH FILTER FOR USE IN CCD VIDEO CAMERA

[75] Inventor: R. Larry Anderton, West Jordan, Utah

[73] Assignee: OEC Medical Systems, Inc., Salt Lake City, Utah

[21] Appl. No.: 279,972

[22] Filed: Jul. 25, 1994

[51] Int. Cl.$^6$ .................................................. H04N 9/64
[52] U.S. Cl. ................................... 348/246; 382/275
[58] Field of Search ............................. 348/241, 246, 348/247; 382/274, 275, 322; H04N 9/64

[56] References Cited

U.S. PATENT DOCUMENTS

| | | | |
|---|---|---|---|
| 4,193,093 | 3/1980 | St. Clair | 358/160 |
| 4,237,488 | 12/1980 | Takemura | 358/163 |
| 4,488,178 | 12/1984 | Koslov et al. | 358/163 |
| 5,168,379 | 12/1992 | Mori et al. | 358/213.17 |
| 5,392,070 | 2/1995 | Endo et al. | 348/247 |
| 5,398,060 | 3/1995 | Leacock et al. | 348/241 |

*Primary Examiner*—John K. Peng
*Assistant Examiner*—Ngoc-Yen Vu
*Attorney, Agent, or Firm*—Thorpe North & Western, L.L.P.

[57] ABSTRACT

A pixel artifact/blemish filter for use in a CCD video camera which produces a video signal composed of a series of pulses, each representing a pixel, for developing a video image. The filter includes a delay line for receiving the video signal produced by the camera, and for delaying the video signal pulses by a time of approximately one pulse width duration. The filter also includes first and second signal transfer elements for receiving respectively each video signal pulse directly from the camera and each most recently delayed video signal, and for passing either the directly received pulse or the delayed pulse, depending upon the relative magnitude of the two pulses. Since pixel artifact pulses are typically more positive than non-artifacts pulses, the signal transfer elements generally pass the more negative video signal pulses so that the pixel artifact pulses are suppressed when they arrive at the transfer elements.

13 Claims, 2 Drawing Sheets

PIXEL ARTIFACT/BLEMISH FILTER FOR USE IN CCD VIDEO CAMERA

BACKGROUND OF THE INVENTION

1. The Field of the Invention. This invention relates to a picture element (pixel) artifact or blemish filter and more particularly to such a filter designed especially for use in charge-coupled device video cameras.

2. The Background Art. A charge-coupled device (CCD) is comprised of an array of semiconductor elements typically formed on an integrated circuit chip, in which each element can store an electrical charge and the charges can be transferred from one element to the next to an output location or terminal. CCD's have gained widespread use in video cameras as a component for storing video images, the charges stored in the semiconductor elements each representing a picture element (pixel) in the image. The quantity of charge in each semiconductor element, at an instant in time, represents the amount of light in the corresponding pixel of the video image. In other words, the stored charges in the CCD represent a stored video image which can be read from the CCD by transferring the charges, as a series of electrical pulses called the video signal, to an output location. See, for example, Curry, Thomas S., Dowdey, James E. and Murry, Robert C. *Christensen's Physics of Diagnostic Radiology*, 4th Edition, Lea and Febiger, 1990, Chapter 13.

CCD video cameras, in addition to becoming the dominantly used consumer video camera, are increasingly being used in the imaging chain of fluoroscopic imaging systems. However, acceptance has been slowed in part due to image artifacts or blemishes from pixel non-uniformities. These artifacts or blemishes may take the form generally of either variations in gain (sensitivity) or offset (leakage or dark current) of individual pixels. The lighter (brighter) form of artifact or blemish is especially offensive to the user since they appear as scattered small white dots in a fluoroscopic image, and become more obvious as the temperature increases with continued use of the fluoroscopic equipment.

Various image processing approaches have been proposed for eliminating the pixel artifacts including the storing in digital memory of each pixel information and also storing the offset and gain parameters for each pixel, and then using these parameters to correct the video signal on a pixel (pulse) by pixel (pulse)basis during production of the video image. This approach is costly and complicated and therefore generally not favored. Another proposed approach is to use a "median filter" to detect non-uniform or variant pixel values and replace them with values determined by surrounding pixels. This approach also requires costly and complicated video processing circuitry.

OBJECTS AND SUMMARY OF THE INVENTION

It is an object of the invention to provide a simple and inexpensive method and apparatus for substantially eliminating pixel artifacts and blemishes in a CCD video camera.

It is also an object of the invention to provide such a method and apparatus in which the video signal output of a CCD camera may be filtered to remove single pixel artifacts and blemishes.

It is a further object of the invention to provide such a method and apparatus for substantially reducing pixel artifacts and blemishes without significantly affecting the remaining portions of the video image being produced.

The above and other objects of the invention are realized in a specific illustrative embodiment of an artifact/blemish suppression circuit for suppressing pixel artifacts/blemishes which may occur in video images represented in a video signal composed of a series of electrical pulses, where each pulse represents a pixel in the image. The pixel artifacts/blemishes being suppressed are characterized as (1) occurring with a high degree of singularity in that they occur in a single pixel and generally not in adjacent pixels, (2) being positive or greater in pulse magnitude than surrounding non-variant pixels, and (3) having a duration of about one pixel. The suppression circuit for suppressing the pixel artifacts/blemishes includes an input terminal for receiving video signal pulses from a video camera, a delay line for successively delaying the received pulses by approximately one pulse width duration, an output terminal, and a filter for receiving paired pulses comprising a non-delayed pulse from the input terminal and a delayed pulse from the delay line, and for suppressing those portions of one pulse of each pair which are greater in magnitude than corresponding portions of the other pulse of each pair, to thus pass the said corresponding portions to the output terminal. The filter illustratively may be composed of transistors connected in an emitter-follower configuration, diodes connected in a back-to-back configuration, or similar circuit components suitable for filtering or suppressing variant pixel pulses from a video signal.

BRIEF DESCRIPTION OF THE DRAWINGS

The above and other objects, features and advantages of the invention will become apparent from the consideration of the following detailed description presented in connection with the accompanying drawings in which.

DETAILED DESCRIPTION

Figure 1:
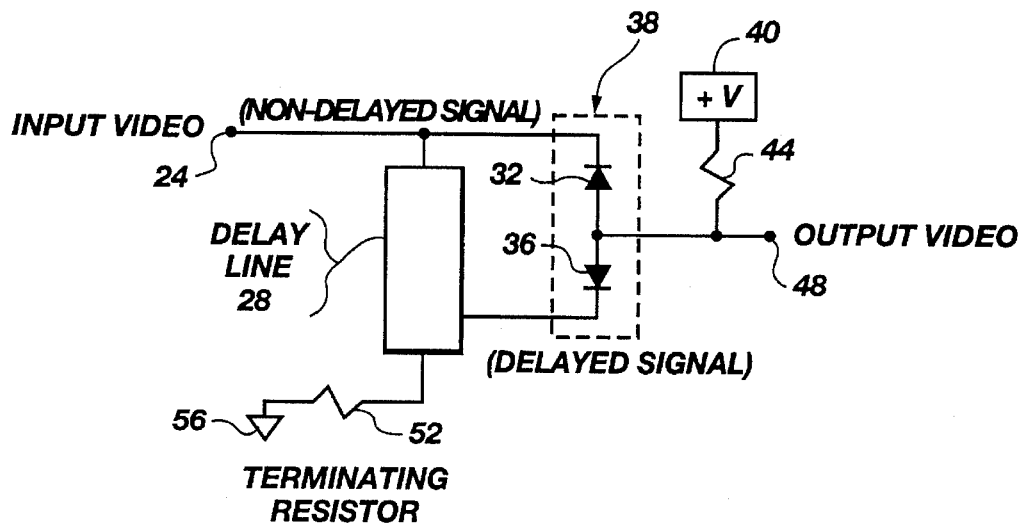
FIG. 1 is a circuit schematic of one embodiment of a pixel artifact/blemish filter made in accordance with the principles of the present invention.
Figure 2:
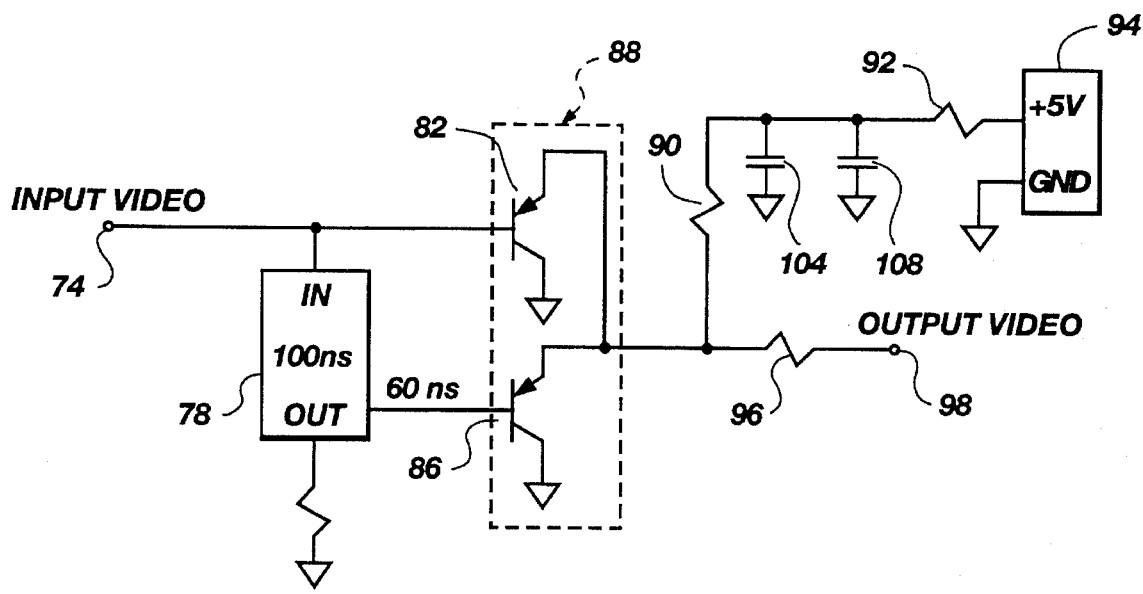
FIG. 2 is a circuit schematic of another embodiment of a pixel artifact/blemish filter made in accordance with the present invention.
Figure 3:
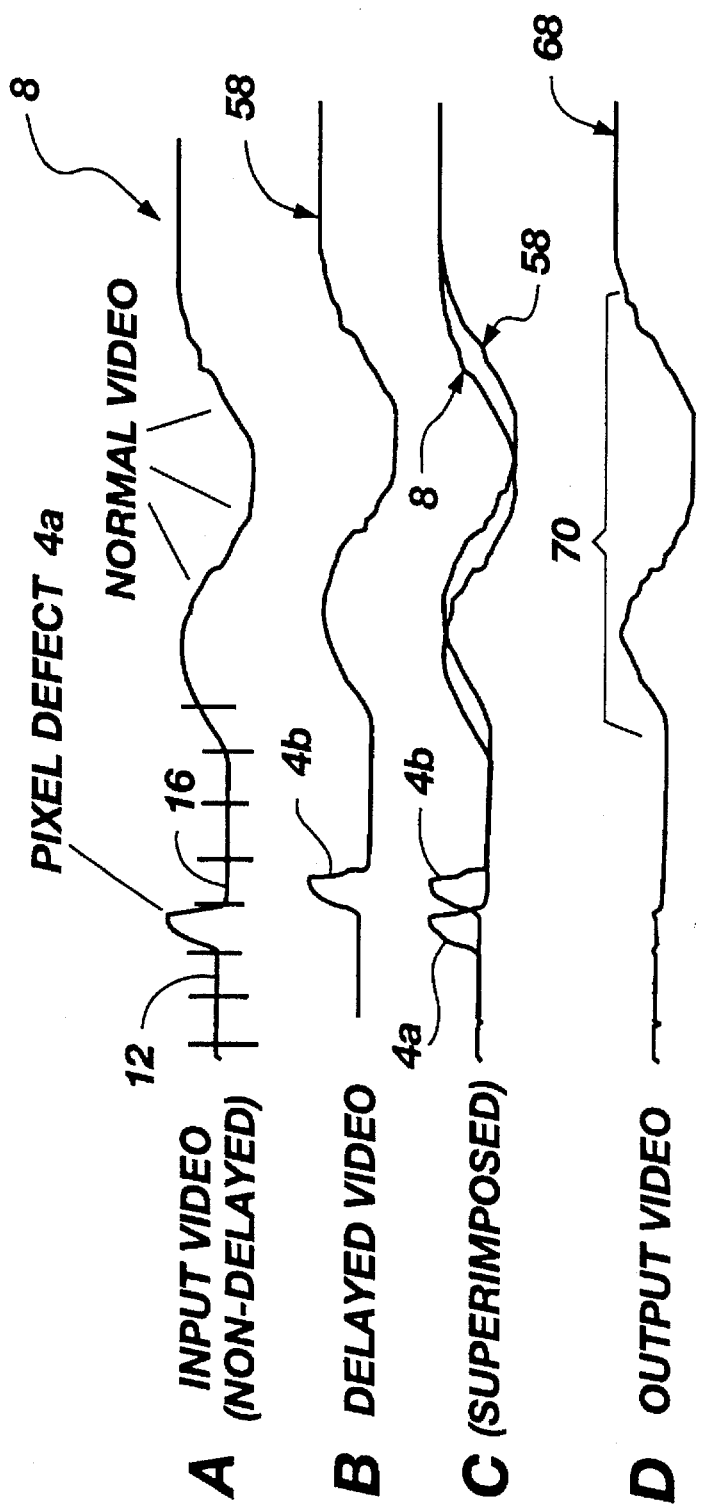
FIG. 3 is a diagram representing video signals illustrating the nature of a pixel artifact/blemish and how such artifact/blemish is removed or suppressed by the present invention.

The filter embodiments shown schematically in FIGS. 1 and 2 provide for suppressing or filtering singular pixel artifacts or blemishes such as pulse 4 of a video signal 8, diagrammatically represented in FIG. 3. The pixel artifact 4 is shown as being a positive pulse, greater in magnitude than adjacent pulses of the video signal such as 12 and 16 of FIG. 3, shown as being flat.

Referring to FIG. 1, there is shown one embodiment of the present invention which includes an input terminal 24 for receiving a video signal from a CCD video camera, the signal being composed of a series of electrical pulses representing charges previously stored in the array of semiconductor elements of the CCD camera. The input terminal 24 is coupled to a delay line 28 and to the cathode of a diode 32. The output of the delay line 28 from which the delayed signal is issued, is coupled to the cathode of another diode 36. The anodes of the diodes 32 and 36 are coupled together, to a voltage source 40 via a resistor 44, and to an output terminal 48. The delay line 28 is also coupled via a resistor 52 to ground potential 56.

The delay line 28 delays the video signal supplied thereto by a time of about one video signal pulse duration or less and then supplies the signal to the diode 36. Illustratively, for a video signal pulse with a duration of 55 nano seconds, the delay line 28 delays the video signal by 70 nano seconds. The delay line 28 might illustratively be a tapped delay line (Rhombus Industries, part no. TSB66-20, 100 ns).

In operation, the non-delayed signal pulse, received at the input terminal 24, is supplied to diode 32 at the same time the delayed signal pulse (previously received pulse) is supplied to the diode 36. Assuming that the non-delayed pulse supplied to the diode 32 represents the non-uniform pixel (artifact) and is thus more positive or of greater magnitude than the pulse arriving just prior and now being issued from the delay line 28 to the diode 36, diode 36 will be forward biased and diode 32 reversed biased. Thus, the delayed pulse (which does not exhibit the artifact at that instant) will be transferred via the diode 36 to the output terminal 48. Following this, the pixel artifact pulse will pass through and be delayed by the delay line 28 and then emerge from the delay line for application to the diode 36, at the same time as the next received, non-artifact and non-delayed pixel pulse is applied to diode 32. Since the non-artifact, non-delayed pulse is more negative than the delayed pixel artifact pulse, diode 32 will be forward biased and diode 36 reverse biased, providing a signal path for the non-delayed pulse to the output terminal 48.

In the manner described, the pixel artifact has been effectively eliminated or suppressed by the filter of FIG. 1. This is illustrated in FIG. 3 which shows at line A an illustrative input video signal 8 containing the pixel artifact 4a, positioned graphically above a video signal 58 (line B) representing the delayed video signal and showing the pixel artifact 4b shifted or delayed in time to a position just behind the location of the non-delayed pixel artifact 4a of signal 8. The video signals 8 and 58 are shown superimposed on one another in line C of FIG. 3, with pixel artifact 4a of the non-delayed signal appearing beside pixel artifact 4b of the delayed signal. Line D of FIG. 3 shows the resulting output video signal 68 which would be supplied to the output terminal 48 of FIG. 1, with the pixel artifact 4 being substantially suppressed; also shown is the resulting normal video signal portion 70, after filtering. Note that the resulting output video signal portion 70 is only insignificantly altered by the filtering process from the shape of the original input video signal.

FIG. 2 is a schematic of another embodiment of the pixel artifact filter of the present invention and includes an input terminal 74 coupled to a delay line 78 and to the base electrode of a PNP transistor 82. The delay line 78 is coupled to the base electrode of another PNP transistor 86, to provide a delayed video signal thereto. The transistors 82 and 86 are connected in an emitter-follower configuration to act as diodes with current gain. This serves to avoid loading of the delay line 78. In this emitter-follower configuration, the emitter electrodes of the transistors 82 and 86 are coupled together and via a resistor 90 and a resistor 92 to a voltage source 94, and also via a resistor 96 to an output terminal 98. Capacitors 104 and 108 are coupled in parallel to a location between resistors 90 and 92 and to ground potential. The capacitors 104 and 108 serve to eliminate undesirable noise from entering the circuit via the voltage source 94.

The circuit of FIG. 2 operates in a manner similar to that described for the circuit of FIG. 1 in that a non-delayed pixel artifact pulse is applied to the base electrode of transistor 82 at about the same time that the previously received non-artifact pulse is emerging from the delay line 78 for application to the base electrode of the transistor 86. The artifact pulse, being more positive than the non-artifact, delayed pulse, results in the transistor 86 being turned on to effectively pass the non-artifact pulse to the output terminal 98. Thereafter, the pixel artifact pulse passes through the delay line 78 to the transistor 86 at the same time as the next received non-artifact pulse is then supplied to the transistor 82. The just received non-artifact pulse causes transistor 82 to turn on to allow passage of the pulse to the output terminal 98. Again, as with the FIG. 1 circuit, the pixel artifact is suppressed or eliminated from the video signal supplied to the input terminal 74.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

What is claimed is:

1. In a charge-coupled device video camera for producing a video image signal composed of a series of pulses, each representing a pixel, from which a video image may be developed, a pixel artifact filter for filtering pixel artifact pulses which differ in magnitude from next adjacent non-artifact pulses, said filter comprising:

delay means for receiving the video image signal produced by the camera, and for delaying each video image signal pulse of the signal by a predetermined amount, and means for receiving each non-delayed video image signal pulse directly and unmodified from the camera, pairing each non-delayed pulse and most recently delayed pulse, and for passing either said each non-delayed pulse or said each delayed pulse, depending upon the relative magnitude of the pulses.

2. A pixel artifact filter as in claim 1 wherein said delay means is adapted to delay the pulses a time approximately equal to the time duration of one pulse.

3. A pixel artifact filter as in claim 1 wherein a pulse with a larger magnitude produces a pixel which is brighter than is a pixel produced by a pulse with smaller magnitude, and wherein said receiving means is adapted to pass the pulse whose magnitude is less.

4. A pixel artifact filter as in claim 3 wherein said receiving means comprises first and second rectifier means for receiving respectively said each directly and unmodified pulse and said each delayed pulse, said first and second rectifier means being adapted so that one or the other is forward biased to pass the corresponding pulse if that pulse has less magnitude than the pulse received by the other rectifier means.

5. A pixel artifact filter as in claim 4 wherein said first and second rectifier means comprise first and second transistors respectively, connected in an emitter-follower configuration.

6. A pixel artifact filter as in claim 5 wherein said receiving means further comprises a connection between the emitter electrodes of the transistors, a voltage terminal coupled to the emitter electrodes connection for receiving a voltage signal, and an output terminal coupled to the emitter electrodes connection, and wherein the base electrode of the first transistor is adapted for receiving said each directly and unmodified received pulse, and the base electrode of the second transistor is adapted for receiving said each delayed pulse.

7. A pixel artifact filter as in claim 4 wherein said first and second rectifier means comprise first and second diodes respectively.

8. A pixel artifact filter as in claim 7 wherein said receiving means further comprises a connection between the anodes of the diodes, a voltage terminal coupled to the anode connection for receiving a voltage signal, and an output terminal coupled to the anodes connection, and wherein the cathode of the first diode is adapted to receive said each directly and unmodified received pulse, and the cathode of the second diode is adapted to receive said each delayed pulse.

9. A blemish suppression circuit for suppressing pixel blemishes which may occur in video images represented in a video image signal composed of a series of electrical pulses, with each pulse representing a pixel in the image, each pixel blemish characterized by an increase in magnitude of the pulse representing said each pixel blemish, said suppression circuit comprising:

input means for receiving the video image signal pulses, delaying means for successively delaying the received pulses by approximately a one pulse width duration, output means for outputting the pulses, means for receiving and pairing a non-delayed pulse unmodified and direct from the input means and a delayed pulse from the delaying means, and for suppressing an artifact pulse of each pair which is significantly greater in magnitude than a non-artifact pulse of each pair, and means for passing said non-artifact pulse to the output means.

10. A blemish suppression circuit as in claim 9 wherein said receiving and means comprises first and second transfer means for receiving directly and unmodified the non-delayed pulses and delayed pulses respectively, said first and second transfer means being adapted to transfer to the output means said non-artifact pulse.

11. A blemish suppression circuit as in claim 10 wherein said first and second transfer means comprise first and second transistors respectively, coupled in an emitter-follower configuration, with the emitter electrodes of the transistors being coupled together and to the output means, and the base electrodes of the first and second transistors being coupled respectively to the input means and delaying means, said circuit further including a voltage source coupled to the emitter electrode coupling.

12. A blemish suppression circuit as in claim 10 wherein said first and second transfer means comprise first and second diodes respectively, with the diode anodes being coupled together and to the output means, and the cathodes of the first and second anodes being coupled respectively to the input means and delaying means, said circuit; further including a voltage source coupled to the anode coupling.

13. In a charge-coupled device video camera for producing a video image signal composed of a series of pulses, each representing a pixel, for developing a video image, a method of filtering pixel artifact pulses which differ in magnitude from adjacent non-artifact pulses, said method comprising:

(a) receiving the video image signal produced by the video camera;

(b) delaying the pulses of the video image signal for a time approximately equal to the time duration of one pulse;

(c) pairing each video image signal pulses directly and unmodified from the camera wherein each pair of pulses composed of the most recently received non-delayed pulse and the most recently delayed pulse;

(d) suppressing an artifact pulse of each pair which is significantly greater in magnitude that a non-artifact pulse of each pair; and (e) passing the non-artifact pulse to an output.

* * * * *